(12) United States Patent
Takeuchi et al.

(10) Patent No.: US 8,770,547 B2
(45) Date of Patent: Jul. 8, 2014

(54) FLUID CONTROL VALVE

(75) Inventors: Mitsuhiro Takeuchi, Kasugai (JP); Michio Miyashita, Seto (JP)

(73) Assignee: CKD Corporation, Komaki-shi (JP)

( * ) Notice: Subject to any disclaimer, the term of this patent is extended or adjusted under 35 U.S.C. 154(b) by 259 days.

(21) Appl. No.: 13/353,871

(22) Filed: Jan. 19, 2012

(65) Prior Publication Data
US 2012/0193564 A1    Aug. 2, 2012

(30) Foreign Application Priority Data
Jan. 31, 2011  (JP) ................................. 2011-018108

(51) Int. Cl.
*F16K 7/00*    (2006.01)

(52) U.S. Cl.
USPC ........................................ 251/331; 251/61.5

(58) Field of Classification Search
CPC ............... F16K 7/12; F16K 7/14; F16K 7/16; F16K 7/17; F16K 41/10; F16K 41/103
USPC ................. 251/61–63.6, 331, 335.2
See application file for complete search history.

(56) References Cited

U.S. PATENT DOCUMENTS

| | | | |
|---|---|---|---|
| 4,198,028 A * | 4/1980 | Cook ........................... | 251/61.2 |
| 4,721,133 A * | 1/1988 | Sundblom ..................... | 251/61.1 |
| 5,002,086 A * | 3/1991 | Linder et al. .................. | 251/61.5 |
| 5,924,441 A * | 7/1999 | Leys et al. ................... | 251/335.2 |
| 6,672,561 B2 * | 1/2004 | Kerg et al. ..................... | 251/331 |
| 8,025,268 B2 * | 9/2011 | Masamura et al. ........... | 251/331 |
| 8,087,641 B2 * | 1/2012 | Masamura ..................... | 251/331 |
| 8,267,372 B2 * | 9/2012 | Masamura ..................... | 251/331 |

FOREIGN PATENT DOCUMENTS

| | | |
|---|---|---|
| JP | U-62-158264 | 10/1987 |
| JP | U-3-100012 | 10/1991 |
| JP | U-3075790 | 3/2001 |
| JP | A-2001-277015 | 10/2001 |
| JP | A-2006-153132 | 6/2006 |
| JP | A-2009-2442 | 1/2009 |

OTHER PUBLICATIONS

Japanese Office Action issued in Japanese Patent Application No. 2011-018108 on Jan. 8, 2013 (with translation).

* cited by examiner

*Primary Examiner* — Eric Keasel
(74) *Attorney, Agent, or Firm* — Oliff PLC (57) ABSTRACT

A fluid control valve includes a resin valve body formed with first and second passages, a resin valve upper part connected to an upper surface of the valve body, and a resin diaphragm valve element held between the valve body and the valve upper part.

6 Claims, 12 Drawing Sheets

FLUID CONTROL VALVE

CROSS-REFERENCE TO RELATED APPLICATIONS

This application is based upon and claims the benefit of priority from the prior Japanese Patent Application No. 2011-018108, filed Jan. 31, 2011, the entire contents of which are incorporated herein by reference.

TECHNICAL FIELD

The present invention relates to a fluid control valve including a resin valve body having a first passage and a second passage, a resin valve upper part connected to an upper surface of the valve body, and a resin diaphragm valve element held between the valve body and valve upper part.

BACKGROUND ART

As this type of technique, heretofore, there is a fluid control valve 100 disclosed in Patent Document 1 listed below and shown in FIG. 11.

Figure 11:
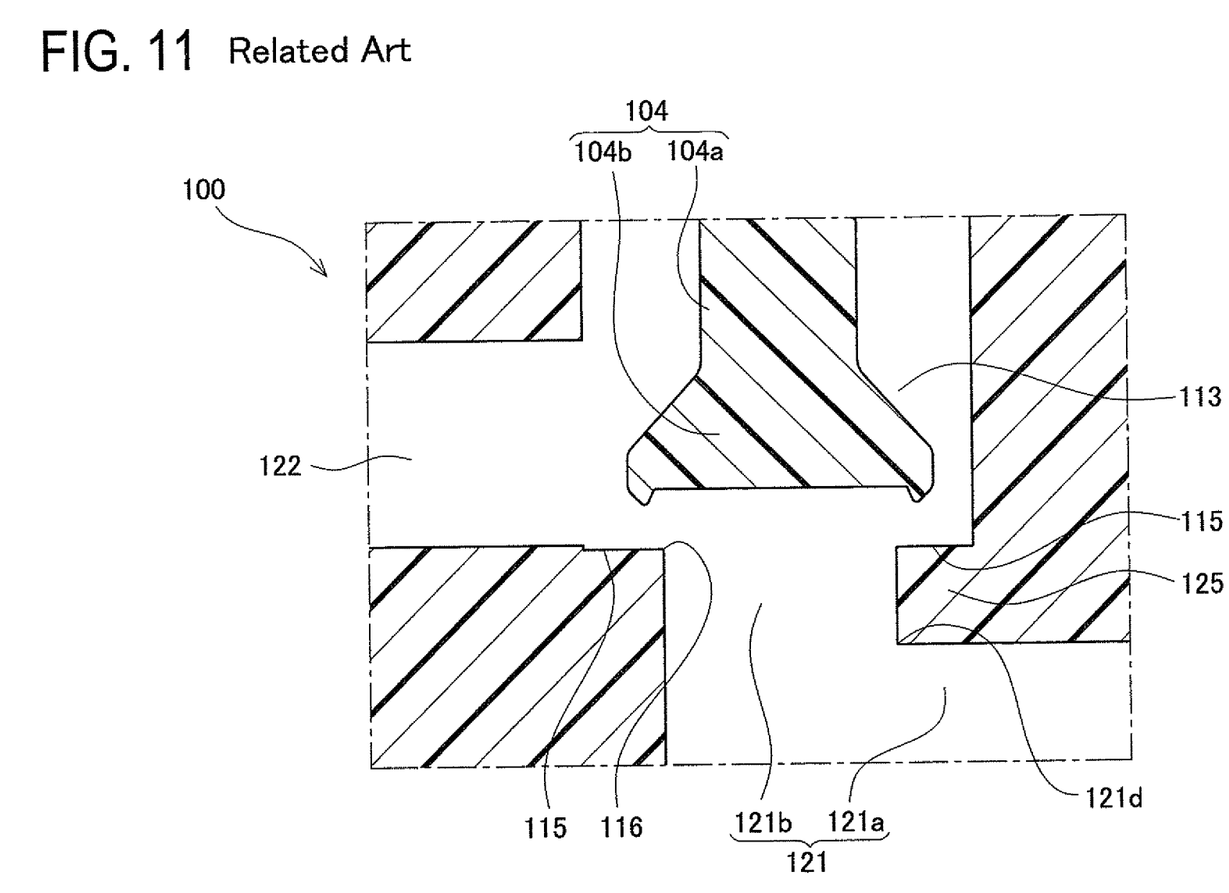
FIG. 11 is a cross sectional view of a conventional fluid control valve.

As shown in FIG. 11, the fluid control valve 100 is provided with a valve chamber 113 in which a first passage 121 and a second passage 122 are communicated with each other. Further, those first and second passages 121 and 122 are communicated respectively with tubes not shown for supplying a fluid. A valve seat 115 is formed around a valve hole through which the valve chamber 113 is connected to the first passage 121. Further, a diaphragm valve element 104 is provided to come into or out of contact with the valve seat 115. The first passage 121 includes a port communication passage 121a and a valve-hole communication passage 121b. The first passage 121 and the second passage 122 are connected with each other at a right angle in the fluid control valve 100. A connecting part between the port communication passage 121a and the valve-hole communication passage 121b includes a valve seat wall portion 125 under the valve seat 115.

A fluid flowing in the first passage 121 through the tube passes through the valve chamber 113 and then flows in the second passage 122.

RELATED ART DOCUMENTS

Patent Documents

Patent Document 1: JP2006-153132A

DISCLOSURE OF THE INVENTION

Problems to be Solved by the Invention

However, the above conventional art has the following problems. Specifically, the passages in the fluid control valve 100 and the tubes connected with the valve 100 have the same inner diameter. Nevertheless, the fluid control valve 100 having a complicated passage structure is liable to cause large pressure loss of a fluid flowing in the valve 100. This deteriorates the flow of the fluid, decreasing Cv value, thus resulting in a reduced flow rate.

A fluid has a property of flowing from a high-pressure place to a low-pressure place in a shortest distance. However, since the valve seat wall portion 125 is located on the path from the first passage 121 to the second passage 122, the passage in the connecting part is curved and made longer, thus disturbing the flow of a fluid. Accordingly, the smooth flow of a fluid is disturbed, leading to a decrease in Cv value, thus resulting in a reduced flow rate.

Furthermore, the fluid will collide against the valve seat wall portion 125 that may disturb the smooth flow of the fluid and hence generate a turbulent flow. Such a turbulent flow disturbs other streams of the fluid excepting a main stream and decreases the Cv value.

The present invention has been made to solve the above problems and has a purpose to provide a fluid control valve configured to have an increased passage area and allow a straight flow and include no part that is apt to disturb a smooth flow of a fluid, thereby improving flowing easiness of the fluid.

Means of Solving the Problems (1) To achieve the above purpose, one aspect of the invention provides a fluid control valve including: a resin valve body formed with a first passage and a second passage; a resin valve upper part connected to an upper surface of the valve body; and a resin diaphragm valve element held between the valve body and the valve upper part, wherein the valve body is internally formed with a valve hole through which the first passage and the second passage are communicated with each other, the first passage includes a port communication passage of a cylindrical shape having one end communicating with a port provided in the valve body and a valve-hole communication passage of a cylindrical shape having one end communicating with the valve hole, the port communication passage and the valve-hole communication passage being communicated with each other at a predetermined angle, and a part of the valve body forming a connecting part on an internal corner side between the port communication passage and the valve-hole communication passage is formed with a curved surface having a taper shape.

According to the above configuration, the passage area is large and thus it is possible to prevent a decrease in Cv value and increase a flow rate. Specifically, the curved surface providing a tapered cross section ("tapered curved surface") is formed in the connecting part (a part of the valve body) located on the internal corner side (on the inner circumferential side) between the port communication passage and the vent-hole communication passage, and thus an oblique flow path is additionally provided between the port communication passage and the valve-hole communication passage. Accordingly, this oblique flow path contributes to an increase in passage area by just that much, thereby allowing an increase in flow rate.

Further, since the tapered curved surface is formed in the connecting part, the first passage includes no portion that disturbs the flow of a fluid. Therefore, a flow path from the first passage to the second passage becomes nearly straight, so that an actual flow path length is shortened, thus achieving a smooth flow of a fluid. This can prevent a decrease in Cv value and increase a flow rate. Since the first passage includes no portion that disturbs the flow of a fluid, the fluid is less likely to collide against a seat wall portion forming the connecting part and hence reduce a turbulent flow caused by collision. Because of less turbulent flow, the decrease in Cv value can be prevented.

Furthermore, it is also possible to determine an appropriate inclination angle of the tapered curved surface to adjust the direction of a fluid flowing directly from the first passage to the second passage so that a flow path from the first passage to the second passage becomes nearly straight. Accordingly, the fluid can flow from the first passage to the second passage while maintaining initial momentum. This can prevent a decrease in Cv value.

Further, the fluid control valve can increase a flow rate (flow volume) without being increased in size than a conventional one. This configuration leads to energy saving.

(2) In the fluid control valve described in (1), preferably, the tapered curved surface is formed by a cutting tool that takes a conical rotation track.

Further, by the use of the cutting tool having the shape corresponding to the curved surface with the tapered cross section, the tapered curved surface with a desired inclination angle can be easily formed in the connecting part. Specifically, no additional complicated work is needed to form the tapered curved surface in the resin fluid control valve, so that the connecting part can be easily provided with the tapered curved surface.

Effects of the Invention

According to the present invention, a fluid control valve can be provided with a large passage area and with no portion that is apt to disturb the flow of a fluid, so that a fluid is allowed to flow along a straight path.

MODE FOR CARRYING OUT THE INVENTION

A detailed description of a preferred embodiment of the present invention will now be given referring to the accompanying drawings.

<Whole Configuration of Fluid Control Valve>

Figure 1:
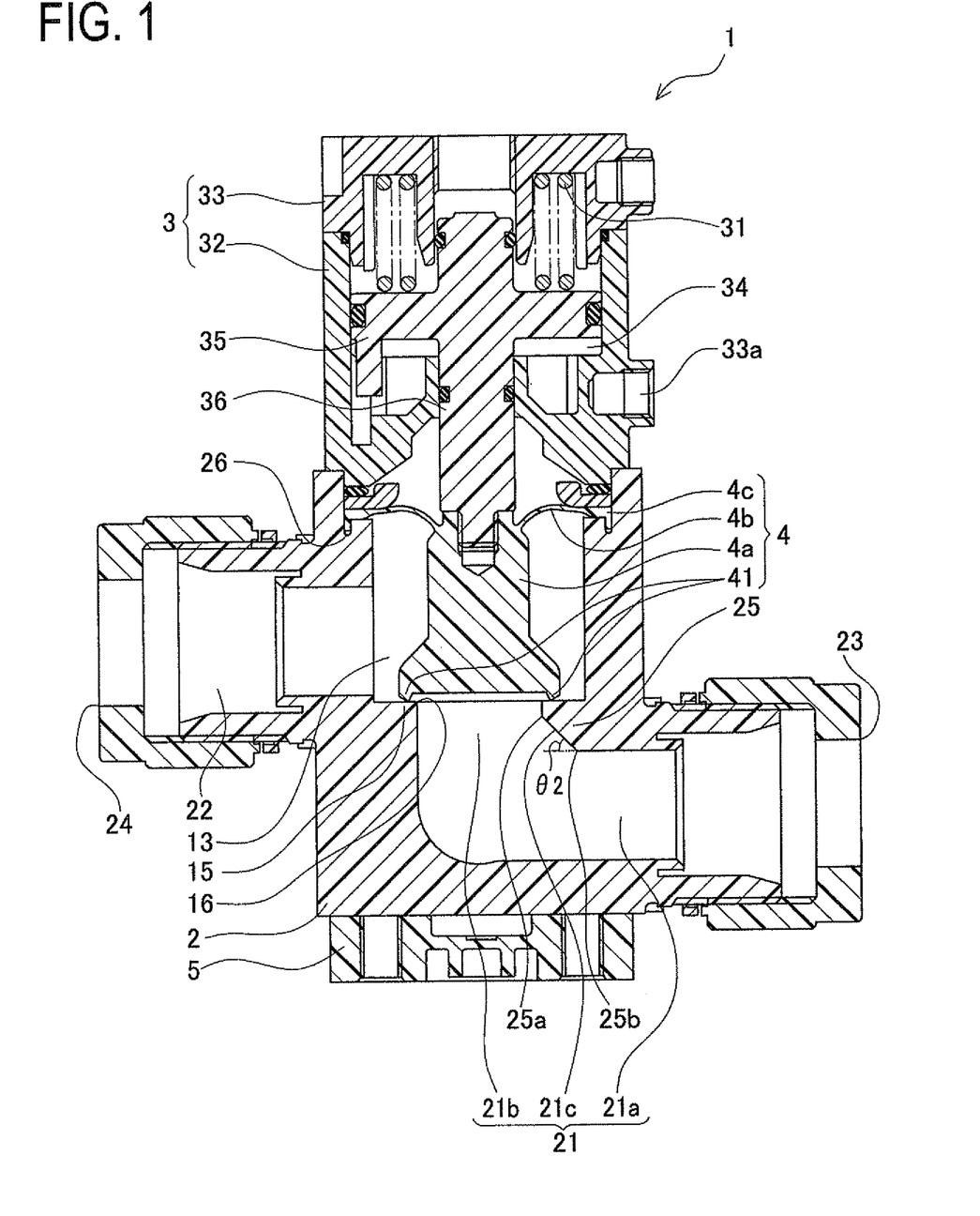
FIG. 1 is a cross sectional view of a fluid control valve (in a valve open state) of a present embodiment.
Figure 2:
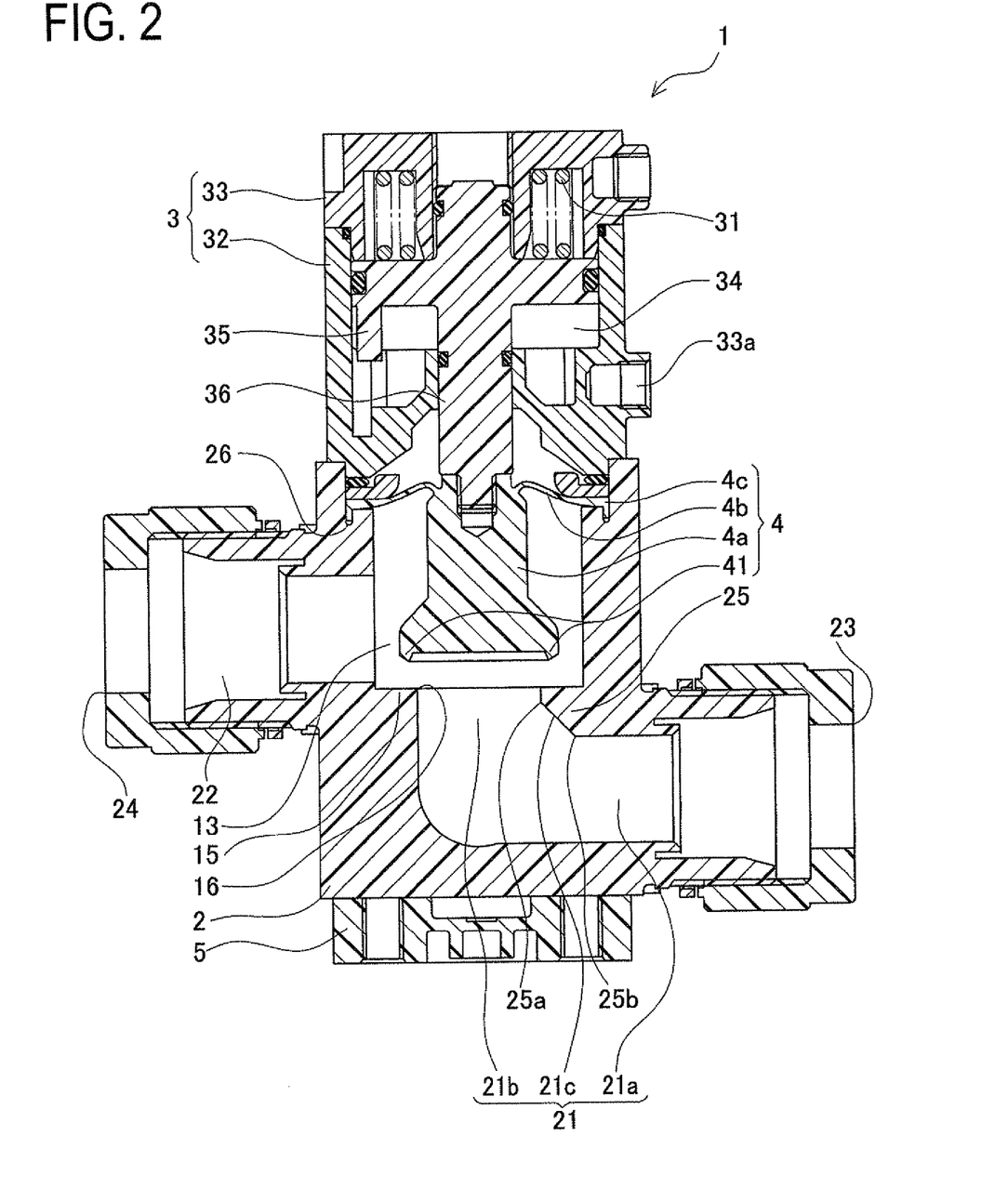
FIG. 2 is a cross sectional view of the fluid control valve (in a valve closed state) of the present embodiment.

FIG. 1 is a cross sectional view of a fluid control valve 1 (in a valve closed state) in the present embodiment. FIG. 2 is a cross sectional view of the fluid control valve 1 (in a valve open state) in the present embodiment.

The fluid control valve 1 shown in FIGS. 1 and 2 will be installed in a semiconductor manufacturing device as in a conventional art to supply a predetermined fluid (e.g., a chemical solution). The fluid control valve 1 in this embodiment is a normally-closed, air-operated open/close valve. The fluid control valve 1 includes a resin valve body 2, a resin valve upper part 3 connected to an upper surface of the valve body 2, and a diaphragm valve element 4 firmly held between the valve body 2 and the valve upper part 3. The fluid control valve 1 is configured such that sliding of a piston 35 in the valve upper part 3 brings the diaphragm valve element 4 into or out of contact with a valve seat 15. In the fluid control valve 1, a mounting plate 5 for attachment of the valve 1 to the semiconductor manufacturing device is fixed to a lower surface of the valve body 2.

<Configuration of Resin Valve Body>

The resin valve body 2 is molded of resin having superior corrosion resistance and heat resistance, such as FIFE (polytetrafluoroethylene) and PFA (tetrafluoroethylene-perfluoroalkyl vinyl ether copolymer).

As shown in FIG. 1, a valve chamber 13 is formed in a cylindrical shape that opens in the upper surface of the valve body 2. In the valve chamber 13, one end of a first passage 21 is connected to one end of a second passage 22. The first passage 21 is communicated, at the other end thereof, with a circular first port 23. The second passage 22 is communicated, at the other end thereof, with a circular second port 24. The valve body 2 is further formed with a valve hole 16 in a position where the first passage 21 opens in the valve chamber 13. Around the valve hole 16, the valve seat 15 is integrally formed with the valve body 2.

The first passage 21 includes a port communication passage 21a having a cylindrical shape communicated with the first port 23 and a valve-hole communication passage 21b having a cylindrical shape communicated with the valve chamber 13. The port communication passage 21a is formed to extend in an axial direction of the first port 23, while the valve-hole communication passage 21b is formed to extend in the axial direction of the valve hole 16. The port communication passage 21a and the valve-hole communication passage 21b are connected at a predetermined angle (a right angle in the present embodiment) inside the valve body 2. Between the port communication passage 21a and the valve-hole communication passage 21b and the valve chamber 13 in FIG. 1, a valve seat wall portion 25 defining the valve seat 15 is formed.

Figure 9:
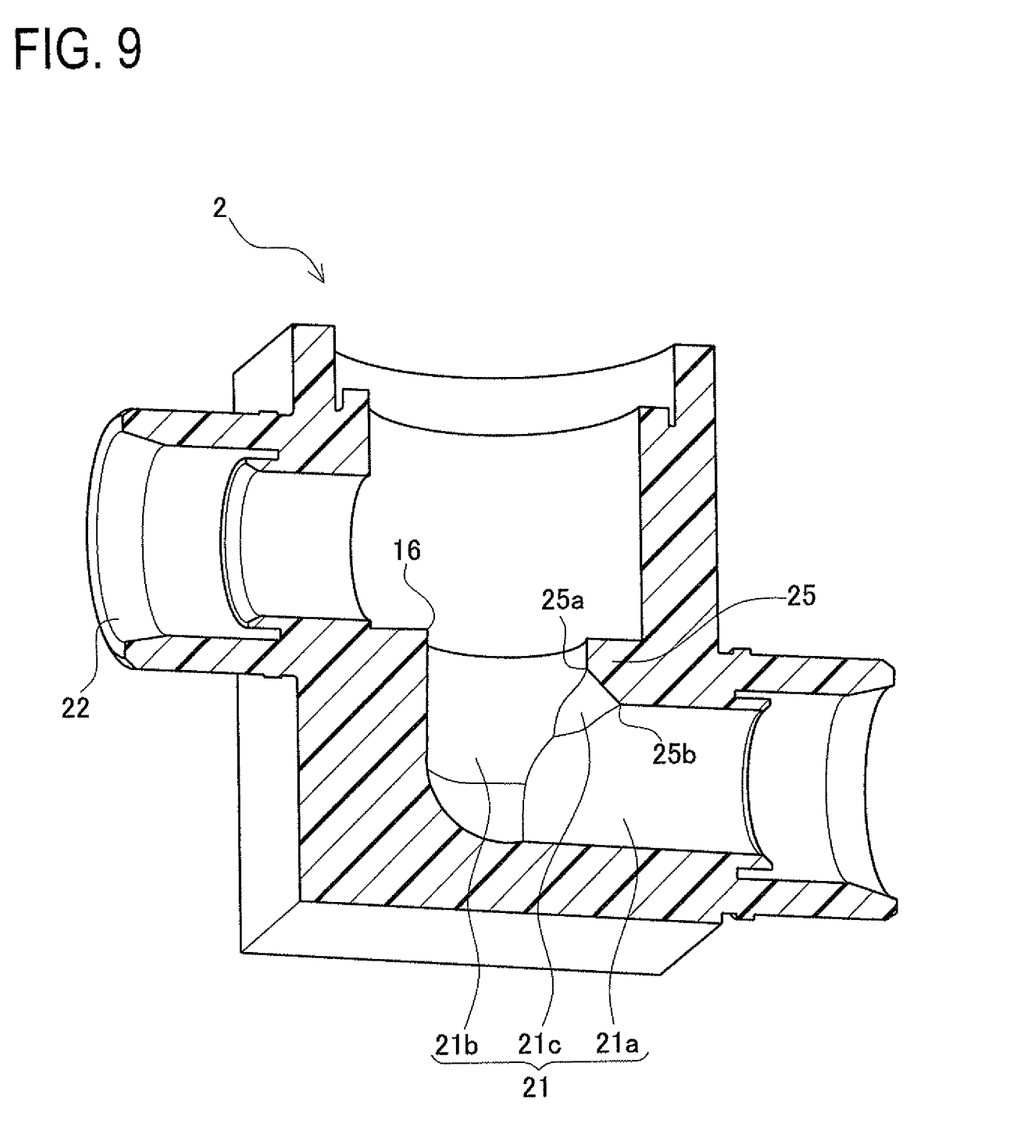
FIG. 9 is a cross sectional perspective view showing a manufacturing step (4) for the resin valve body of the present embodiment.

As shown in FIG. 1, the valve seat wall portion 25 forming the connecting part on the internal corner side (an inner circumferential side) between the port communication passage 21a and the valve-hole communication passage 21b includes, as a surface facing those passages 21a and 21b, a curved surface 21c having a tapered cross section (hereinafter, referred to as a "tapered curved surface") (see FIG. 9). This curved surface 21c is formed, in section, to join a first corner 25a and a second corner 25b of the valve seat wall portion 25. The first corner 25a is formed in a side wall surface on the internal corner side (the inner circumferential side) of the valve-hole communication passage 21b and the second corner 25b is formed in a side wall surface of the internal corner side (inner circumferential side) of the port communication passage 21a.

<Method of Forming Tapered Curved Surface>

FIGS. 6 to 9 are cross sectional perspective views showing forming steps (1) to (4) for the tapered curved surface 21c of the valve body 2.

Figure 6:
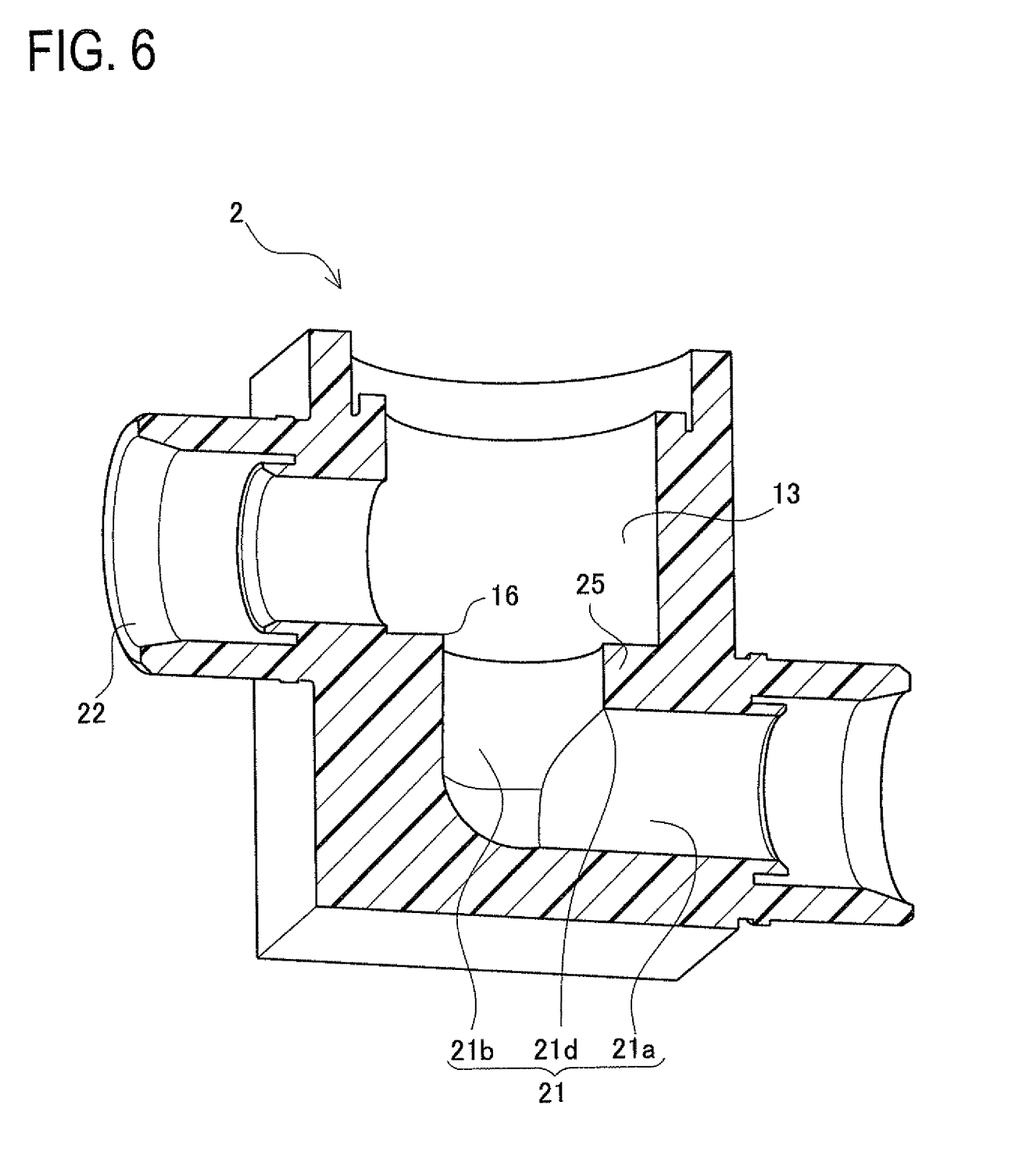
FIG. 6 is a cross sectional perspective view showing a manufacturing step (1) for a resin valve body of the present embodiment.

The method of forming the tapered curved surface 21c is to form the tapered curved surface 21c in the valve body 2 shown in FIG. 6 in which the tapered curved surface 21c is unformed. A method of forming the valve body 2 shown in FIG. 6 before the tapered curved surface 21c is formed is similar to a conventional method and thus the details thereof are not provided herein.

Figure 7:
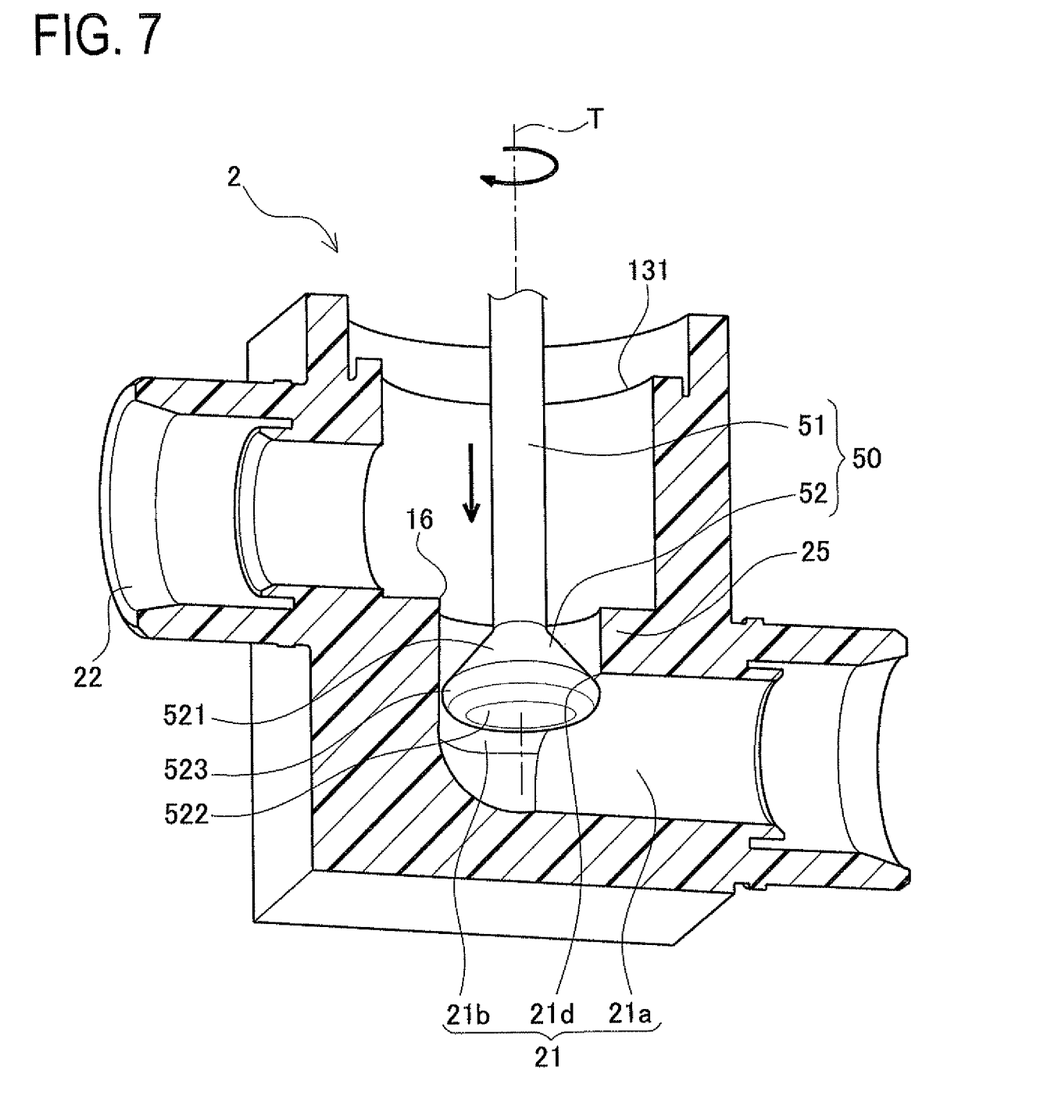
FIG. 7 is a cross sectional perspective view showing a manufacturing step (2) for the resin valve body of the present embodiment.

As shown in FIG. 7, a cutting tool 50 is vertically moved downward in an opening 131 of the valve chamber 13 opening in the upper surface of the valve body 2, to enter in the valve-hole communication passage 21b in a direction of an axis T. When the cutting tool 50 is moved down to a position in which a middle portion of a tapered portion 521 of the cutting tool 50 in the axis direction is same height (level) as a corner portion 21d, the cutting tool 50 is stopped in the position as shown in FIG. 7. In the present embodiment, the cutting tool 50 is moved down while rotating clockwise about the axis T. Although the cutting tool 50 in the present embodiment is rotated during downward movement, for example, it may be moved downward without rotation.

Figure 10:
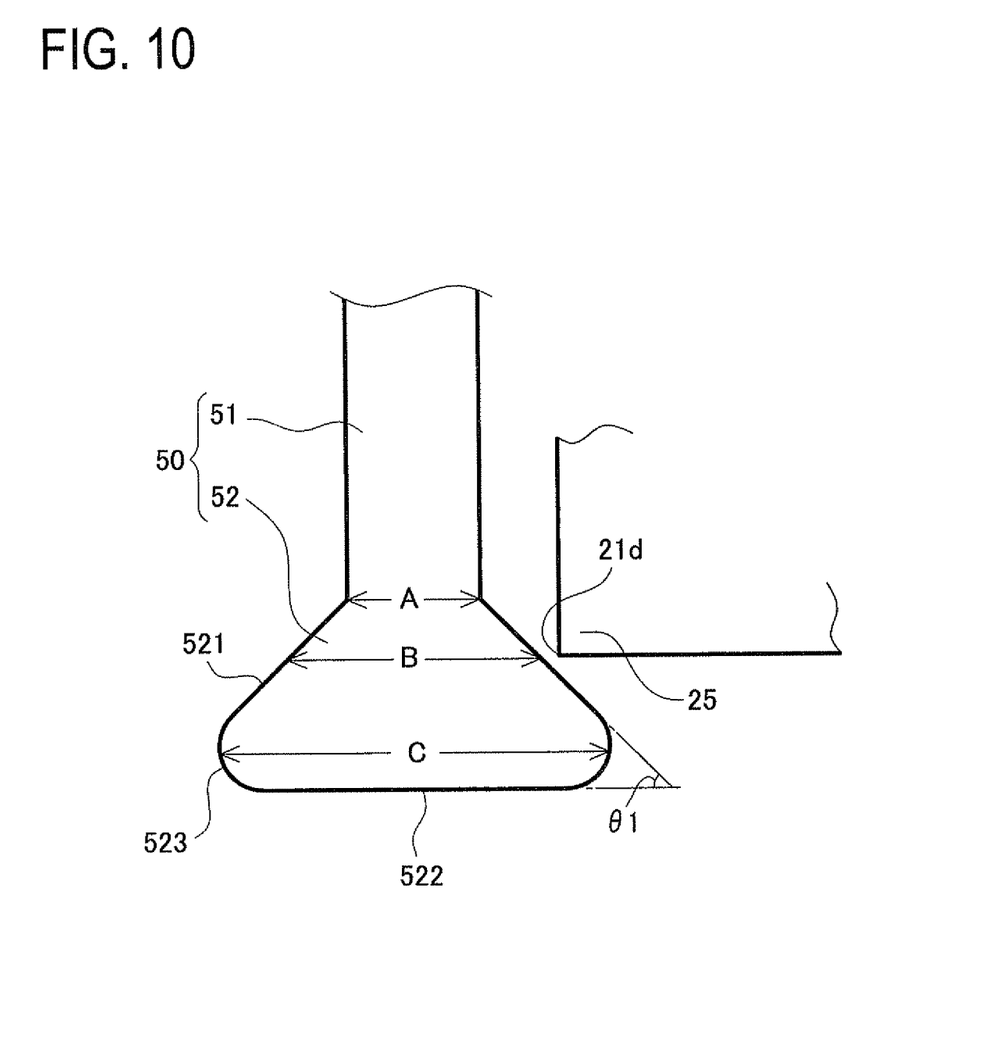
FIG. 10 is a side view of a cutting tool in the present embodiment.

FIG. 10 is a side view of the cutting tool 50. As shown in FIG. 10, the cutting tool 50 includes a shaft 51 and a cutting part 52 fixed to a leading end (a lower end in the figure) of the shaft 51. The cutting part 52 has an almost conical shape and includes a tapered portion 521, a bottom surface 522, and a curved surface 523. The tapered portion 521 is designed as a cutting surface. An inclination (taper) angle (θ1) of the tapered portion 521 is 45° with respect to the bottom surface 522 in the present embodiment. The diameter of the nearly-conical cutting part 52 includes a small diameter A, a largest diameter C, and a diameter B existing between the diameters A and C, which are provided in order from a portion close to the shaft 51. The diameter C is determined to be smaller than the diameter of the valve-hole communication passage 21b. Accordingly, the cutting tool 50 is allowed to enter in the valve-hole communication passage 21b. The diameter A is equal to the diameter of the shaft 51.

Figure 8:
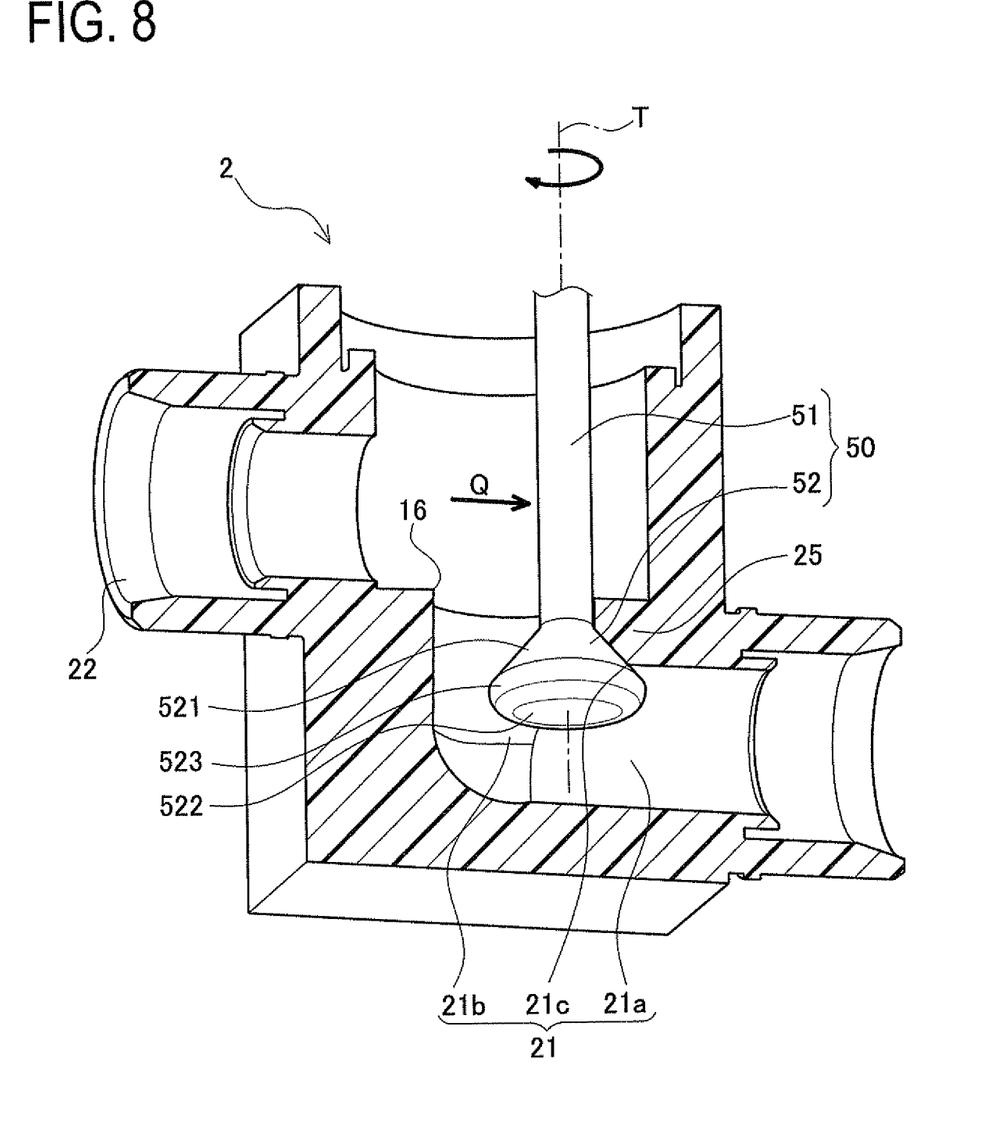
FIG. 8 is a cross sectional perspective view showing a manufacturing step (3) for the resin valve body of the present embodiment.

As shown in FIG. 8, the cutting tool 50 is moved in a direction indicated by an arrow Q while the tool 50 is being rotated clockwise about the axis T for example so that the tapered portion 521 of the tool 50 presses against the corner portion 21d (shown in FIG. 7). Specifically, the cutting tool 50 is moved horizontally so that the axially middle portion of the cutting part 52 having the diameter B horizontally contacts with the corner portion 21d, as shown in FIG. 10. The tapered portion 521 designed with a cutting shape for enabling a cutting work can cut the angular corner portion 21d. The corner portion 21d is cut or ground by the tapered portion 521. Accordingly, in the present embodiment, the corner portion 21d is processed to the tapered curved surface 21c inclined at an angle (θ2) (see FIG. 1) of 45° equal to the inclination angle (θ1) of the tapered portion 521.

In the present embodiment, the cutting tool 50 is moved so that the middle portion of the cutting part 52 of the tool 50 having the diameter B horizontally contacts with the corner portion 21d. However, a portion of the cutting part 52 to be brought into contact with the corner portion 21d can be appropriately changed according to a cutting angle to the corner portion 21d or other conditions.

Thereafter, the cutting tool 50 is moved in an opposite direction to the direction Q to return from the position shown in FIG. 8 to the former position shown in FIG. 7, and then moved upward in the axis T direction in the figure. Thus, the cutting process is terminated. The valve body 2 having been subjected to the cutting work using the cutting tool 50 has the tapered curved surface 21c as shown in FIG. 9. This tapered curved surface 21 has a shape conforming to the surface of the cutting part 52 of the cutting tool 50.

<Configuration of Resin Valve Upper Part>

The resin valve upper part 3 shown in FIG. 1 is made of resin having corrosion resistance and rigidity such as PPS (polyphenylene sulfide), PFA, PP (polypropylene), and PVDF (polyvinylidenefluoride). The valve upper part 3 consists of a cylinder 32 and a cover 33, defining a piston chamber 34. A resin piston 35 is slidably installed in the piston chamber 34 and always urged in a valve closing direction by return springs 31 placed in compressed form between the piston 35 and the cover 33. The piston 35 is moved up and down inside the piston chamber 34 in the figure according to balance between the pressure of operation air supplied to the piston chamber 34 through an operation port 33a and the repulsive force of the return springs 31. The piston 35 is integrally formed with a piston rod 36. The piston rod 36 integral with the piston 35 is slidably placed in the cylinder 32 and connected to the diaphragm valve element 4.

<Configuration of Diaphragm Valve Element>

The diaphragm valve element 4 is made of a resin having superior corrosion resistance and heat resistance such as PTFE (polytetrafluoroethylene) and formed by cutting. The diaphragm valve element 4 includes a columnar body part 4a which will come into or out of contact with the valve seat 15, a web part 4b extending radially outwardly from an outer surface of the body part 4a, and a circumferential edge part 4c having a thicker thickness than the web part 4b and circumferentially extending along an outer edge of the web part 4b. The diaphragm valve element 4 is fixed in place with the edge part 4c being held between the valve body 2 and the valve upper part 3 and hermetically fit in an annular groove 26. The body part 4a is formed with a seal portion 41 protruding from a bottom of the body part 4a. This seal portion 41 comes into contact with the valve seat 15 for valve closing.

<Operations and Effects of Fluid Control Valve>

(Input/Output of a Fluid)

In the fluid control valve 1, as shown in FIG. 1, the first passage 21 is connected to the first port 23 and the second passage 22 is connected to the second port 24. While no operation air is supplied into the valve 1 through the operation port 33a, the diaphragm valve element 4 is held in contact with the valve seat 15 by the urging force of the return spring 31. Thus, a fluid (e.g., a chemical solution) flowing through the first port 23, the first passage 21, and then flowing to the valve hole 16 is blocked by the diaphragm valve element 4 contacting with the valve seat 15 and thus does not allowed to flow in the second passage 22 and the second port 24.

On the other hand, when operation air is supplied into the valve 1 through the operation port 33a, as shown in FIG. 2, the piston 35 is moved up, thereby separating the diaphragm valve element 4 from the valve seat 15, allowing communication between the first and second passages 21 and 22. Accordingly, the fluid having flowed in the first passage 21 through the first port 23 is supplied to the valve chamber 13 and the second passage 22 via the valve hole 16 and then outputted to the second port 24.

(Effects Resulting from the Presence of a Tapered Curved Surface)

Figure 3:
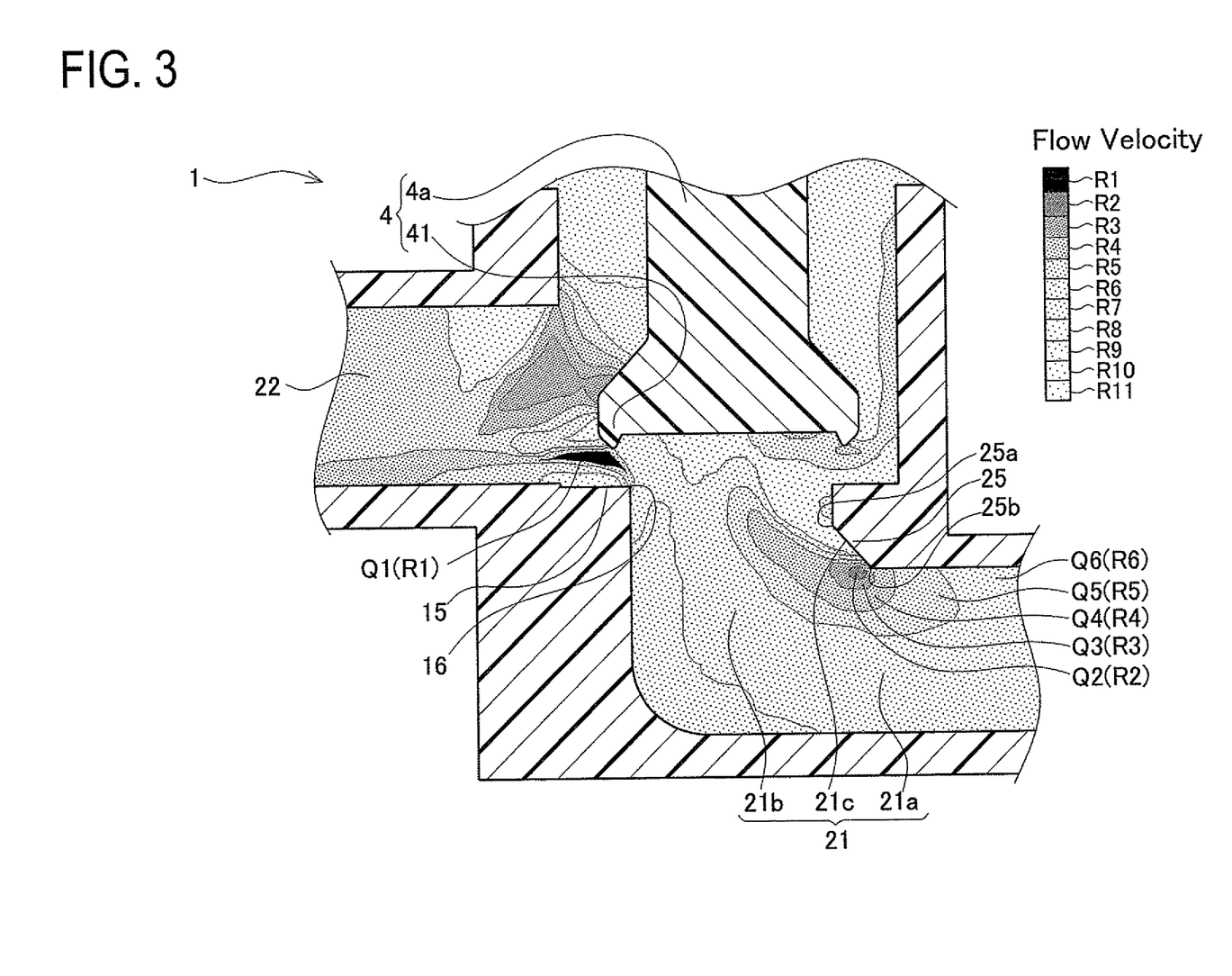
FIG. 3 is a conceptual diagram showing a fluid analysis result of a fluid control valve (I) of the present embodiment.
Figure 4:
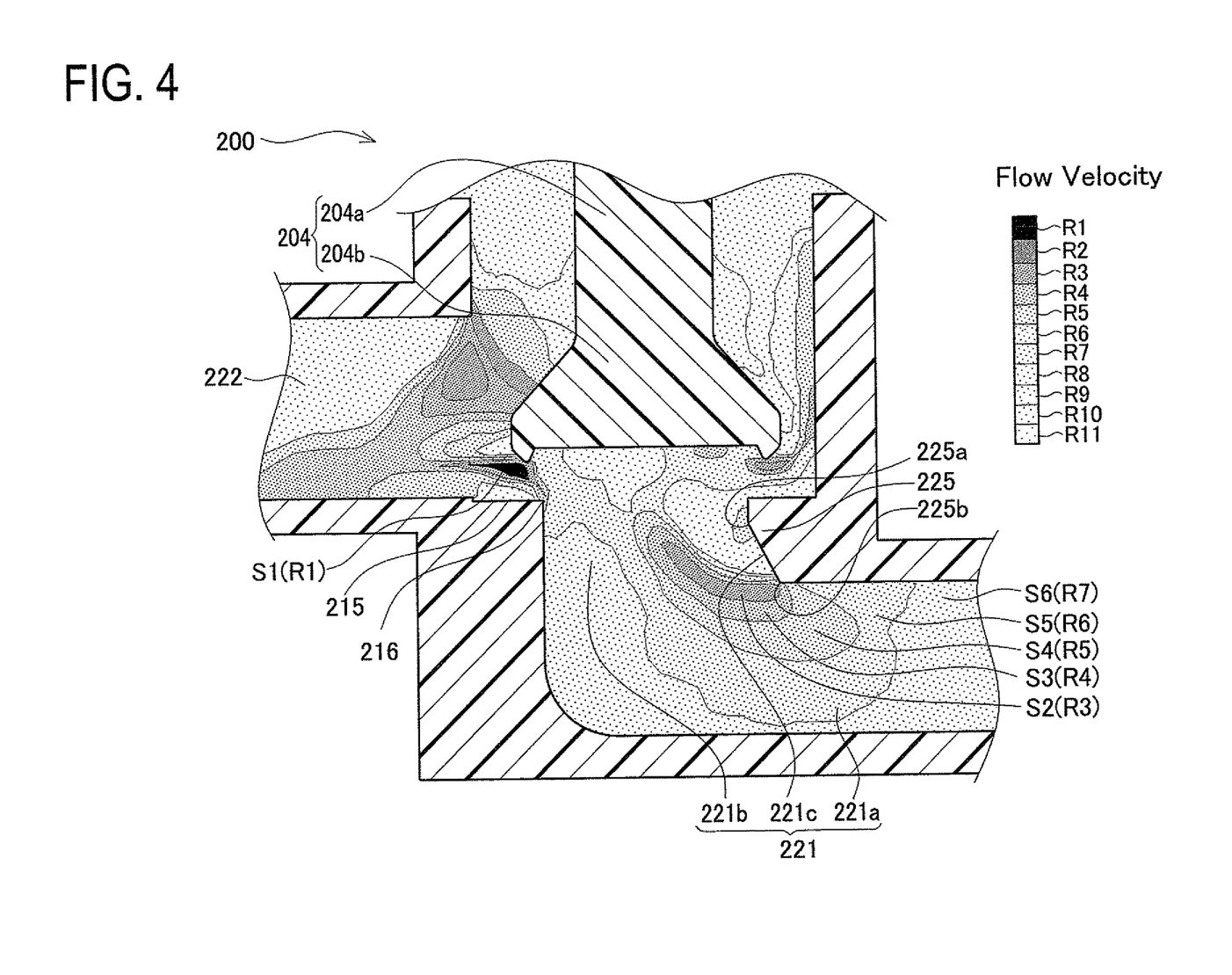
FIG. 4 is a conceptual diagram showing a fluid analysis result of a fluid control valve (II) of the present embodiment.
Figure 5:
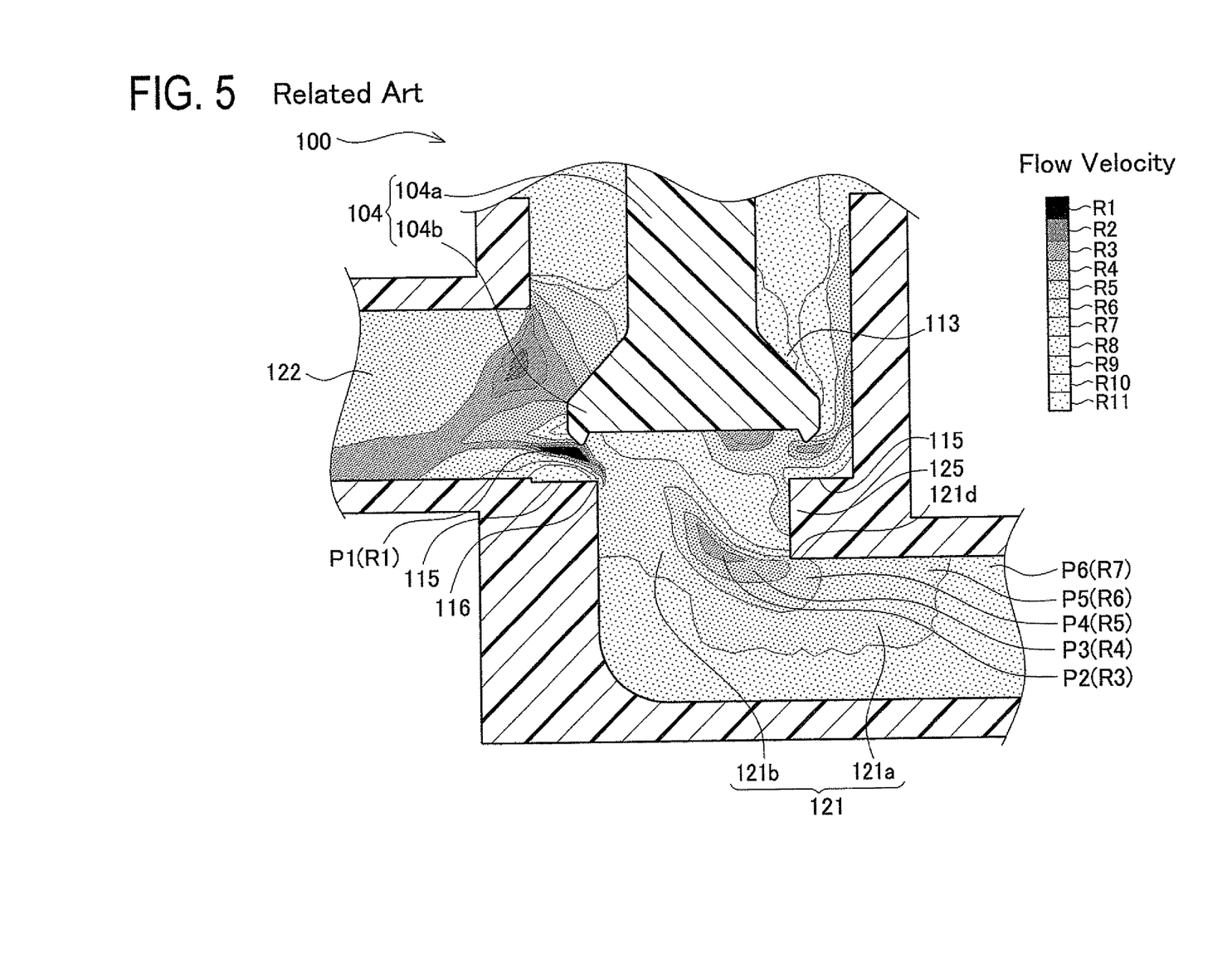
FIG. 5 is a conceptual diagram showing a fluid analysis result of a conventional fluid control valve.

FIG. 3 is a conceptual diagram showing a fluid analysis result of a fluid control valve (I). FIG. 4 is a conceptual diagram showing a fluid analysis result of a fluid control valve (II). FIG. 5 is a conceptual diagram showing a fluid analysis result of a fluid control valve in a conventional art.

The conceptual diagrams of FIGS. 3 to 5 represent results of simulations to investigate changes in flow velocity of a fluid caused to flow in the fluid control valves. Changes in flow velocity from R1 to R11 are illustrated by stipple pattern. As the flow velocity is closer to a faster flow velocity R1, the density of points of the stipple pattern is higher, whereas as the flow velocity is closer to a slower flow velocity R11, the density of points is lower.

(Fluid Analysis Result of the Conventional Fluid Control Valve)

FIG. 5 is a distribution map showing changes in flow velocity in the fluid analysis result of the fluid control valve 100 in the conventional art. As shown in FIG. 5, the fluid control valve 100 includes the valve chamber 113 with which the first passage 121 and the second passage 122 are communicated. The first passage 121 includes the port communication passage 121a and the valve-hole communication passage 121b. The first passage 121 and the second passage 122 are connected at a right angle in the fluid control valve 100. The valve seal wall portion 125 forming the connecting part on the internal corner (inner circumferential) side between the port communication passage 121a and the valve-hole communication passage 121b includes the curved corner 121d as shown in FIG. 5.

A fluid has a property of flowing from a high-pressure place to a low-pressure place in a shortest distance. In the fluid control valve 100 shown in FIG. 5, therefore, the fluid flows from the first passage 121 to the second passage 122 in a shortest distance between the first passage 121 and the second passage 122. The fluid concentrates in a region between the valve seat 115 and the diaphragm valve element 104, the region being in the path of the shortest distance from the first passage 121 to the second passage 122. Accordingly, in a zone P1 between the valve seat 115 and the diaphragm valve element 104, the fluid flows at a faster flow velocity indicated by flow velocity R1.

When the fluid flows from the port communication passage 121a to the valve-hole communication passage 121b, the fluid concentrates in a region around the curved corner 121d located in the path of the shortest distance toward the second passage 122. A region near the curved corner 121d in which the fluid flow velocity is fastest is a zone P2. In this zone P2, the fluid flows at a high flow velocity indicated by flow velocity R3. As the fluid transfers from the zone P2 to zones P3 to P6, the flow velocity becomes slower to flow velocities R4 to R7. Of the fluid flowing toward the second passage 122, around the curved corner 121d, the fluid moves at the flow velocity R6 in a wide region indicated as a zone P5.

(Fluid Analysis Result of Fluid Control Valve (I))

FIG. 3 shows a distribution chart showing changes in flow velocity in the fluid analysis result of the fluid control valve 1 in the present embodiment. As shown in FIG. 3, the fluid control valve 1 has a feature that the connecting part of the port communication passage 21a and the valve-hole communication passage 21b forming the valve seat wall portion 25 includes the tapered curved surface 21c having a tapered cross section with an inclination angle of 45°. Other configurations of the fluid control valve 1 are explained above in detail and thus omitted herein.

As mentioned above, a fluid has a property of flowing from a high-pressure place to a low-pressure place in a shortest distance. In the fluid control valve 1 shown in FIG. 3, therefore, a fluid flows from the first passage 21 to the second passage 22 in a shortest distance between the first passage 21 and the second passage 22. At that time, the fluid concentrates in a region between the valve seat 15 and the diaphragm valve element 4, the region being in the path of the shortest distance from the first passage 21 to the second passage 22. Accordingly, in a zone Q1 between the valve seat 15 and the diaphragm valve element 4, the fluid flows at a high flow velocity indicated by flow velocity R1.

Furthermore, when the fluid flows from the port communication passage 21a to the valve-hole communication passage 21b, the fluid concentrates in a region near the tapered curved surface 21c located in the path of the shortest distance toward the second passage 22. A region near the tapered curved surface 21c, in which the fluid flows at a highest velocity indicated by a zone Q2. In this zone Q2, the fluid flows at a high velocity indicated by flow velocity R2. In the fluid control valve 1 shown in FIG. 3, different from the conventional valve, the tapered curved surface 21c is formed in the first passage 21. Because of the presence of this tapered curved surface 21c, the first passage 21 has an increased area as compared with the conventional one. Accordingly, the flow velocity in the fluid control valve 1 is faster than in the conventional valve. Since the flow rate is also increased as compared with that in the conventional valve, it is possible to prevent a decrease in Cv value.

The reason why the flow velocity of a fluid in the zone Q2 becomes as fast as the flow velocity R2 is in the formation of the tapered curved surface 21c whereby eliminating the curved corner 121d shown in FIG. 5 which is apt to disturb the flow of a fluid in the first passage in the conventional valve. Accordingly, the flow path from the first passage 21 to the second passage 22 becomes nearly straight, shortening an actual flow path length, thus allowing a smooth flow of a fluid. This makes it possible to prevent a decrease in Cv value and increase the flow rate. Since the flow passage becomes nearly straight, it is possible to increase the flow rate by utilizing the property of a fluid that flows in a shortest distance.

Furthermore, in the embodiment shown in FIG. 3, the inclination angle of the tapered curved surface 21c is set to 45°. Because of the inclination angle of 45°, the fluid flowing near the tapered curved surface 21c directly travels toward the zone Q1. Since the fluid directly travels toward the zone Q1, the fluid passing through the first passage 21 can be made to flow in the second passage while maintaining its momentum. Thus, a decrease in Cv value can be avoided.

Consequently, the flow velocity of the fluid smoothly flowing can increase, so that a decrease in Cv value can be prevented.

Since the tapered curved surface 21c is formed, eliminating the curved corner 121d shown in FIG. 5 which is apt to disturb the flow of a fluid in the first passage in the conventional art, the fluid does not generate a turbulent flow which would be generated by colliding against the curved corner 121d. Since such a turbulent flow is not generated, a smooth flow of the fluid is allowed. This can prevent a decrease in Cv value. Thus, the fluid can flow smoothly without generating a turbulent flow, so that the flow velocity of the fluid in the zone Q2 can increase to the flow velocity R2.

As the fluid transfers from the zone Q2 to zones Q3 to Q6, the flow velocity becomes slower to flow velocities R3 to R6. Of the fluid flowing toward the second passage 22, around the curved surface 21c, the fluid moves at the flow velocity R6 in a wide region indicated as a zone Q6. Accordingly, in the zone Q2 in which the flow velocity is fastest excepting the zone Q1, the fluid flows at the flow velocity R2. In the zone Q6 which is a widest region for the fluid flowing, the fluid flows at the flow velocity R6. The zone P5 shown in FIG. 5 and the zone Q6 shown in FIG. 3 are similar in including the flow velocity R6, but the zone Q6 including the flow velocity R6 in FIG. 3 has a larger area than the zone P5 including the flow velocity R6 in FIG. 5. That is, the zone Q6 in which the fluid flows at the flow velocity R6 extends over the entire region of the port communication passage 21a. This is because the tapered curved surface 21c formed in the first passage 21 makes the entire flow of a fluid smoother, leading to a faster flow velocity.

The tapered curved surface 21c formed by the nearly-conical cutting tool 50 has a cut surface area larger as it is closer to the bottom surface 522 and smaller as it is closer to the shaft 51 as with the shape of the cutting tool 50. Accordingly, the tapered curved surface 21c has a cut area that is larger on a side closer to the port communication passage 21a and smaller on a side closer to the valve-hole communication passage 21b. Thus, a fluid will flow at an increasing flow velocity as it flows from a region with a large passage area to a region with a small passage area.

(Fluid Analysis Result of Fluid Control Valve (II))

FIG. 4 shows a distribution chart showing changes in flow velocity in the fluid analysis result of a fluid control valve 200 including a tapered curved surface 221c formed with an inclination angle of 60° different from that of the tapered curved surface 21c of the fluid control valve 1 in the above embodiment. As shown in FIG. 4, the fluid control valve 200 is identical to the fluid control valve 1 except that the inclination angle of the tapered curved surface 221c is 60°. Thus, the details of the fluid control valve 200 are omitted herein.

As mentioned above, a fluid has a property of flowing a high-pressure place to a low-pressure place in a shortest distance. Accordingly, in the fluid control valve 200 shown in FIG. 4, a fluid flows from a first passage 221 to a second passage 222 in a shortest distance between the first passage 221 and the second passage 222. At that time, the fluid concentrates in a region between a valve seat 215 and a diaphragm valve element 204, the region being in the path of the shortest distance from the first passage 221 to the second passage 222. In a zone S1 between the valve seat 215 and the diaphragm valve element 204, accordingly, the fluid flows at a high flow velocity indicated by flow velocity R1. For the same reason as in the conventional art, the fluid concentrates in the zone S1 and flows at a high flow velocity.

When the fluid flows from the port communication passage 221a to the valve-hole communication passage 221b, the fluid concentrates in a region near the tapered curved surface 221c located in the path of the shortest distance. A region in which the fluid flows at a fastest flow velocity near the tapered curved surface 221c is indicated by a zone S2. In the zone S2, the fluid flows at a high flow velocity indicated by flow velocity R3. In the fluid control valve 200 shown in FIG. 4, different from the conventional art, the tapered curved surface 221c is provided in the first passage 221. With the presence of the tapered curved surface 221c, the first passage 221 has a larger passage area than that in the conventional art. Further, a region with the larger passage area corresponds to a connecting part between the valve-hole communication passage 221b and the port communication passage 221a, corresponding to the connecting part between the valve-hole communication passage 121b and the port communication passage 121a in which a fluid concentrates as shown in FIG. 5 in the conventional art. Thus, the fluid is allowed to flow more smoothly. Therefore, the area of the region for the flow velocity R3 faster than that in the conventional art has a larger area than that shown in FIG. 5 in the conventional art.

As the fluid transfers from the zone S2 to zones S3 to S6, the flow velocity becomes slower to flow velocities R4 to R6. Of the fluid flowing near the curved surface 221c toward the second passage 222, the fluid flowing in a wide region indicated by the zone S5 moves at the flow velocity R6. Accordingly, in the zone S2 in which the flow velocity is fastest excepting in the zone S1, the fluid flows at the flow velocity R2. In the zone S5 which is a widest region for fluid flow, the fluid flows at the flow velocity R6. The zone S5 which is the widest region for fluid flow includes the flow velocity R6 as with the zone P5 in the conventional fluid control valve 100 shown in FIG. 5. However, the zone S5 for the flow velocity R6 in FIG. 4 is wider than the zone P5 for the flow velocity R6 in FIG. 5. Specifically, by the presence of the tapered curved surface 221c provided in the first passage 221, the fluid is allowed to entirely smoothly flow and hence at a higher flow velocity. Further, the zone S5 includes the flow velocity R6 as with the zone Q6 in the fluid control valve 1 including the tapered curved surface with an inclination angle of 45° shown in FIG. 3; however, the zone S5 is smaller than the zone Q6 in FIG. 3. This is because the inclination angle of the tapered curved surface 221c is 60°, thus providing a narrower passage area than the configuration with the inclination angle of 45°. Consequently, the tapered curved surface 221c with the inclination angle of 60° can also provide the same effects as in the present embodiment. However, the tapered curved surface with the inclination angle of 45° provides a larger passage area, more contributing to a decrease in Cv value.

The present embodiment explained in detail above can provide the following operations and effects.

Since the tapered curved surface 21c is formed in the connecting part between the port communication passage 21a and the valve-hole communication passage 21b, the first passage 21 can have a larger passage area than in the conventional art. Such a larger passage area can prevent the Cv value from decreasing and thus increase the flow rate. Specifically, with the tapered curved surface 21c formed in the connecting part, an oblique passage is additionally provided between the port communication passage 21a and the valve-hole communication passage 21b. With this additional oblique passage, the flow passage area is increased by just that much and hence the flow rate can be increased.

Since the tapered curved surface 21c is formed in the connecting part, the first passage 21 includes no portion that is apt to disturb the flow of a fluid. Accordingly, the flow path from the first passage 21 to the second passage 22 becomes nearly straight and the actual flow path length is shorter, so that the fluid flows smoothly. This can prevent a decrease in Cv value. Furthermore, no portion that is apt to disturb the flow of a fluid exists in the first passage 21, so that the fluid does not generate a turbulent flow. Thus, the fluid can flow smoothly without being disturbed. This also can prevent a decrease in Cv value.

The inclination angle of the tapered curved surface in the connecting part is adjusted to allow a fluid to directly flow to the second passage 22, so that the fluid flows from the first passage 21 to the second passage 22 while maintaining the momentum. Thus, a decrease in Cv value can be avoided.

It is further possible to increase the flow rate without increasing the compact size of the fluid control valve 1, leading to energy saving.

The tapered curved surface 21c is formed by cutting with the conical (taper) portion of the cutting tool 50 and therefore it can be formed with the corresponding shape (taper) to the conical portion in the connecting part. With the use of the cutting tool 50 having the shape conforming to the tapered curved surface 21c, the tapered curved surface 21c can easily be formed with the desired inclination angle by cutting the connecting part (the valve seat wall portion 25). Specifically, any additional complicated work and others are not needed to form the tapered curved surface 21c in the resin fluid control valve 1 by cutting. The tapered curved surface 21c can therefore be easily formed in the connecting part.

The present invention is not limited to the aforementioned embodiment and may be embodied in other specific forms without departing from the essential characteristics thereof.

For instance, the inclination angle of the tapered curved surface in the present embodiment is set to 45°. If the tapered curved surface is formed with a different angle from 45°, a fluid is apt to flow less smoothly than in the case of the 45° inclination angle but more smoothly than in the conventional art with no tapered curved surface. Consequently, the inclination angle may be set to 45° or more and alternatively 45° or less.

For instance, the above embodiment explains that the inclination angle of the tapered curved surface is set to 45° and thus the fluid can flow from the port communication passage 21a to the valve-hole communication passage 21b with higher momentum, preventing a decrease in Cv value. In addition, if the tapered curved surface has such a shape as to move the fluid directly to the zone Q1 in FIG. 3 between the valve seat 15 and the diaphragm valve element 4, the inclination angle of the tapered surface is not limited to 45°. This is because the shape allowing the fluid to directly move to the zone Q1 can maintain the momentum of the fluid and prevent a decrease in Cv value.

For instance, the fluid control valve 1 in the present embodiment is a normally closed air-operated open/close valve. The present invention may also be applied to other types of air-operated open/close valves such as a normally open type, a normally closed double-acting type, a normally open double-acting type.

Figure 12:
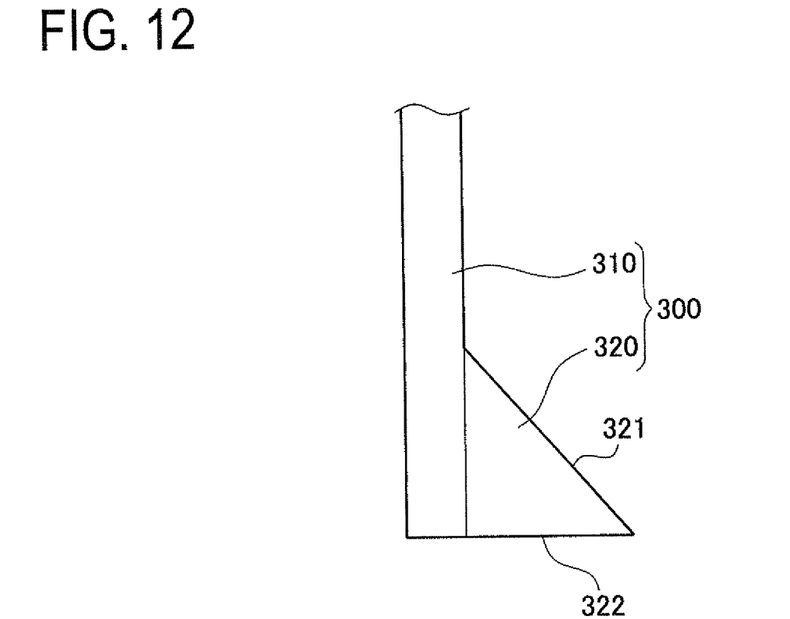
FIG. 12 is a front view of a modified example of the cutting tool in the present embodiment.
Figure 13:
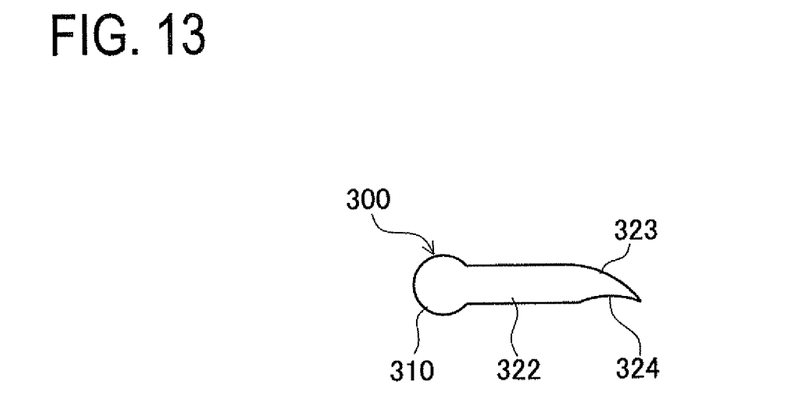
FIG. 13 is a bottom view of the modified example of the cutting tool shown in FIG. 12 in the present embodiment.

For instance, FIGS. 12 and 13 show a modified example of the cutting tool of the embodiment. As shown in FIG. 12, a cutting tool 300 includes a shaft 310 and a cutting part 320 fixedly or integrally provided to a leading end (a lower end in the figure) of the shaft 310. Further, the cutting part 320 has a right-angle triangle shape in front view and includes a tapered surface 321 and a bottom surface 322. This cutting part 320 is formed with a cutting portion 324 inwardly curved in a distal end portion 323 far from the shaft 310, when seen from below, as shown in FIG. 13.

Even though it is not illustrated in the figure, a rotary mechanism such as a motor is provided at a root of the shaft 310 of the cutting tool 300. At the same time when the rotary mechanism is rotated, the shaft 310 is also rotated. By the rotation of the shaft 310, the cutting part 320 fixedly or integrally provided to the shaft 310 is simultaneously rotated. When a tapered curved surface is to be formed, the cutting tool 300 is moved down to a position for forming a tapered surface and then moved horizontally in a cutting direction while rotating. By this horizontal movement as rotating, the cutting tool 300 takes a conical rotation track, thereby forming a tapered surface.

DESCRIPTION OF THE REFERENCE SIGNS

1 Fluid control valve
16 Valve hole
2 Resin valve body
21 First passage
21a Port communication passage
21b Valve-port communication passage
21c Tapered curved surface
22 Second passage
23 First port
24 Second port
25 Valve seat wall portion
25a First corner
25b Second corner
3 Resin valve upper part
4 Diaphragm valve element
50 Cutting tool

The invention claimed is:

1. A fluid control valve comprising:
a resin valve body formed with a first passage and a second passage that are communicated with each other through a valve chamber;
a resin valve upper part connected to an upper surface of the valve body; and
a resin diaphragm valve element held between the valve body and the valve upper part,
wherein
the valve body is internally formed with a valve hole located in a bottom of the valve chamber and in which the first passage opens,
the valve body has a valve seat around the valve hole, with which the resin diaphragm valve element comes into or out of contact,
the first passage includes (1) a port communication passage of a cylindrical shape having one end communicating with a port provided in the valve body and (2) a valve-hole communication passage of a cylindrical shape having one end communicating with the valve hole, the port communication passage and the valve-hole communication passage being communicated with each other at a predetermined angle,
a connecting part between the port communication passage and the valve-hole communication passage is internally formed with a curved surface having a tapered shape, and
the second communication passage is in uneven parallel to the port communication passage and has one end in communication with a second port and an other end opening in a side wall of the valve chamber.

2. The fluid control valve according to claim 1, wherein the tapered curved surface is formed by a cutting tool that takes a conical rotation track.

3. The fluid control valve according to claim 1, wherein the predetermined angle is a right angle.

4. The fluid control valve according to claim 1, wherein an other end of the port communication passage and an other end of the valve-hole communication passage are directly connected.

5. The fluid control valve according to claim 1, wherein the first passage, including the port communication passage and the valve-hole communication passage, and the second passage are coplanar.

6. The fluid control valve according to claim 1, wherein a same axis of the second passage intersects both the one end and the other end of the second passage.

* * * * *